Jan. 2, 1923.
B. HASKELL.
BRACKET FOR BRAKE HANGERS.
FILED APR. 19, 1921.
1,440,734.
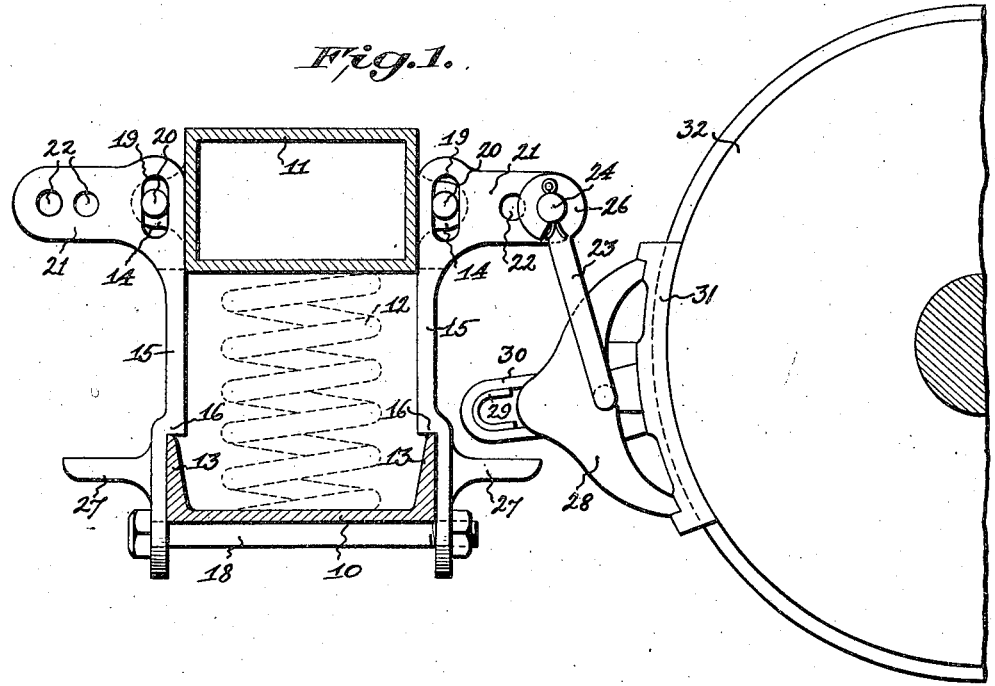
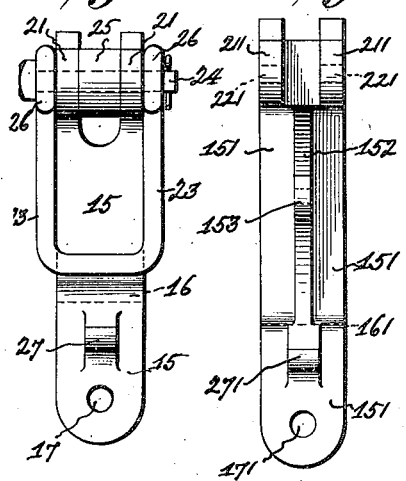
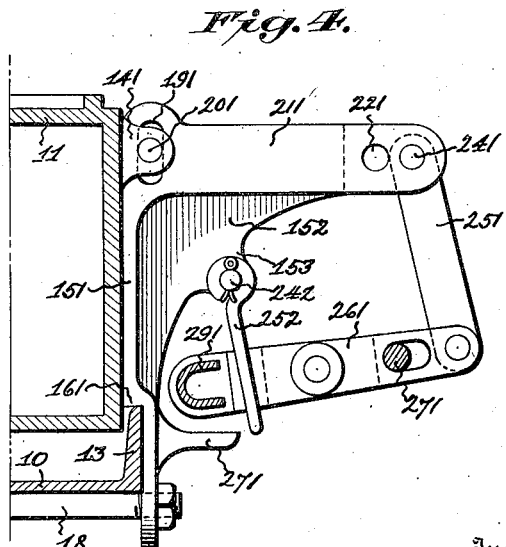
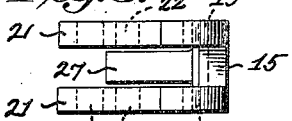
WITNESS:— Chas. L. Griesbauer
Inventor
Broderick Haskell,
By N. Schornborn
Attorney Patented Jan. 2, 1923.

1,440,734

UNITED STATES PATENT OFFICE.

BRODERICK HASKELL, OF FRANKLIN, PENNSYLVANIA.

BRACKET FOR BRAKE HANGERS.

Application filed April 19, 1921. Serial No. 462,497.

*To all whom it may concern:*

Be it known that I, BRODERICK HASKELL, a citizen of the United States, residing at Franklin, in the county of Venango and State of Pennsylvania, have invented certain new and useful Improvements in Brackets for Brake Hangers, of which the following is a specification.

This invention relates to brackets to be attached to the spring plank and bolster of a car truck for properly supporting the brake gearing and brake shoes with respect to the wheels of said truck.

The object of the invention is to provide a bracket which is simple in construction and of a minimum cost to manufacture, and at the same time can be easily, quickly and securely applied to the forms of spring planks, bolsters and brake gearings now in general use and yet permit the rise and fall of said bolsters without injury to the brake gearing or disturbing the proper relation of the brake shoes with respect to the car wheels.

Another object is to so construct a bracket which is capable of carrying a third hanger of the same length as the two commonly used end hangers and enable all three hangers to be placed or arranged at the same angle, whereby said hangers will travel in the same arc and thereby maintain the brake shoes in the same vertical position and proper relation to the wheels.

Other objects and advantages of the invention will appear from the detailed disclosure of the construction and relation of parts to be hereinafter given.

The invention consists of structural characteristics and relative arrangements of elements which will be hereinafter more fully described and particularly pointed out in the appended claims.

In the drawings, in which similar reference characters indicate the same parts in the several figures, Figure 1, is a side view partly in section of a fragment of a railroad car truck with the bracket attached;

Figure 2, is a front elevation of the bracket with a hanger attached;

Figure 3 is a top plan view of the bracket;

Figure 4 is a side view similar to Figure 1 of a modified form of the bracket; and Figure 5 is a front elevation of the bracket shown in Figure 4.

Referring to Figure 1, 2 and 3, 10 represents the spring plank formed by a channel iron having flanges 13 and 13, and 11 is the bolster supported by a spring 12 at each of its ends upon said plank 10 as is common in car trucks and need no further disclosure. Said bolster 11 is provided at each of ends and sides with two separated perforated or drilled lugs 14, 14, for purposes to be presently described.

15 is the improved bracket which is properly supported on each side of the spring blank 10 and bolster 11 and is provided with a shoulder 16 and adapted to engage the upper or free edge of the flange 13 as is clearly shown in Figure 1. Each of said brackets 15 is provided at its lower end with a centrally disposed hole 17, see Figure 2, through which is adapted to be passed a bolt 18, said bolt and hole being so arranged and disposed with respect to each other and the lower outer side of the web of the channel iron forming the spring blank 10, so that when the bolt 18 is tightened up, the bracket 15 on each side of said plank 10 is securedly and rigidly clamped to the outer side of the flange of the spring plank 10 and held from movement either in an upward or lateral direction by the bolt 18, or downward direction by the shoulder 16 with respect to said plank, as will be clearly seen by reference to Figure 1.

The upper end of each of said brackets 15 is of such a width as to loosely pass between the separated lugs 14, 14, and is provided with an elongated slot 19 adapted to receive a pin 20, passing through the perforated lugs 14, 14, on bolster 11, said pin 20 acting as a support and guide for the upper end of the bracket during the rise and fall of the bolster 11 on its springs 12 as the load in the car varies. The upper end of the bracket 15 is provided with lateral extensions 21, 21, having a plurality of openings 22, 22, to receive the upper and pivoted ends of a U-shaped hanger 23, carried by a pin 24 passing through the alined openings 22 in the extensions 21, washer 25, and eyes 26 formed in the upper ends of the hanger 23.

The lower end of the bracket 15 is also preferably provided with a horizontal projecting lug or stop 27 for purposes of intercepting the brake beam and gear in its downward movement in case the hanger 23 becomes detached from the bracket 15. The lower end of the hanger 23 is pivotally connected to the brake head 28 carried by the compression member 29 and strut 30, said brake head 28 having the usual shoe 31 engaging the wheel 32, which last described parts are universally employed in railway trucks and form no part of the present invention.

Referring to Figures 4 and 5, the same invention and type of bracket is shown in the same relation with respect to the spring plank 10 and bolster 11 except that the bracket 151 is applied only at the center section of said bolster, and spring plank 10. Said bracket 151 is provided with a shoulder 161 and hole 171 and passes between two centrally disposed and separated lugs 141 and 141. The elongated slot 191 at the upper end is adapted to receive the pin 201, and the lateral extension 211 is preferably forked at its end and provided with openings 221, 221 to receive a pin 241 carrying a link 251, supporting the usual strut 261, compression member 291 and truss rod 271 as is usual in this class of brake gear. The bracket 151 is provided with a central and longitudinal web 152 having an apertured lug 153 from which is suspended by means of a pin 242 a U-shaped safety hanger 252 surrounding the strut 261 and adapted to catch the brake gear or beam from dropping should the supporting means fail to perform their functions. Said bracket 151 is also provided with a stop 271 similar to the stop 27 shown in Figs. 1, 2 and 3, for purposes of engaging the brake beam or gearing should it for any reason drop after becoming detached from its hanger and supporting means.

From the foregoing disclosure of the construction and arrangement of the improvement and mode of applying the same, it will be seen that all the objects and advantages recited in the statement of invention have been fully and efficiently carried out, and while I have shown and described my preferred form of the bracket many changes will readily suggest themselves without in any way departing from the salient features herein disclosed and embodied in the scope of the claims.

What I claim is:

1. In a truck, the combination with a spring plank, a truck bolster movably supported on said spring plank, a bracket having one of its ends rigidly secured to the side of said spring plank and its other end movably connected to the bolster to permit said truck bolster and bracket to have relative movement with respect to each other, a brake hanger, and means for pivotally connecting said brake hanger to said bracket.

2. In a truck, the combination with a spring plank, a truck bolster movably supported on said spring plank, a bracket having its lower end rigidly secured to the outer side of said spring plank and its upper end movably connected to the bolster to permit said truck bolster and bracket to have relative movement with respect to each other, a brake hanger, and means for pivotally connecting said brake hanger to said bracket.

3. In a truck, the combination with a spring plank, a truck bolster movably supported on said spring plank, a bracket having a shoulder at its lower end engaging an edge of said plank and rigidly secured to the outer side of said spring plank and the upper end of said bracket movably connected to the bolster and means on said bracket for pivotally connecting a brake hanger thereto.

4. In a truck, the combination with a spring plank, a truck bolster movably supported on said spring plank, a bracket having a shoulder on one side and a stop on the other side of its lower end rigidly secured to the outer side of said spring plank, said shoulder engaging an edge of said plank, and the upper end of said bracket being movably connected to the bolster, and means on said bracket for pivotally connecting a brake hanger thereto.

5. A bracket for attaching a brake hanger to a car truck which comprises a section so constructed, arranged and adapted to engage an outer side of a spring plank, and an elongated slot at its other end to movably engage a movable bolster, and an extension projecting laterally from said straight section for pivotally connecting a brake hanger.

6. A bracket for attaching a brake hanger to a car truck which comprises a straight section having a shoulder near one end so constructed, arranged and adapted to engage an outer upper edge of a spring plank, and an elongated slot at its other end to movably engage a projection on an outer side of a movable bolster, and an extension projecting laterally from said straight section for pivotally connecting a brake hanger.

7. A bracket for attaching a brake hanger to a car truck which comprises a straight section having a stop on one side, and a shoulder on the other side near one end so constructed, arranged and adapted to engage an outer upper edge of a spring plank, and an elongated slot at its other end to movably engage a projection on the outer side of a movable bolster, and an extension projecting laterally from said straight section for pivotally connecting a brake hanger.

8. In a truck, the combination with a spring plank, a truck bolster movably supported on said spring plank, a bracket fixed to said spring plank and movably connected to the bolster to permit said bolster and bracket to have relative movement with respect to each other, a brake hanger, and means for flexibly connecting said brake hanger to said bracket.

In testimony whereof I affix my signature.

BRODERICK HASKELL.